Dec. 18, 1945.   R. B. GRONTKOWSKI   2,391,017
BRAKE CONTROL MECHANISM
Filed Nov. 2, 1942
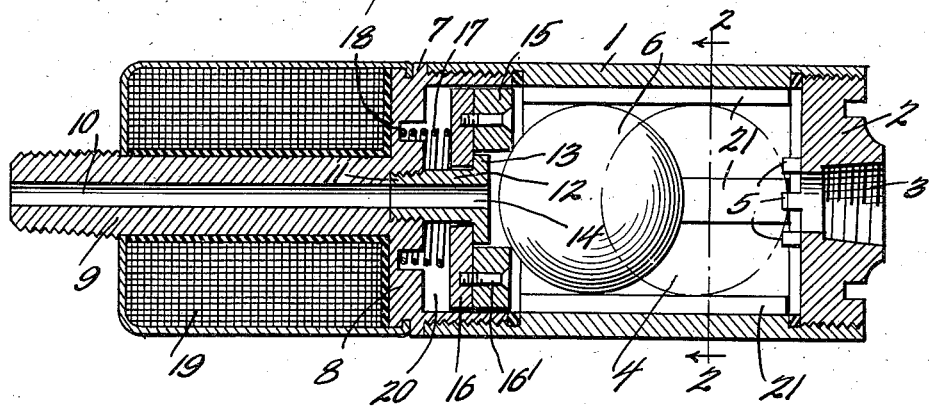
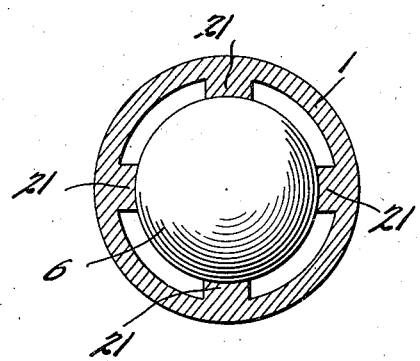
Inventor
Raymond B. Grontkowski
By Sol Shappirio
Attorney Patented Dec. 18, 1945

2,391,017

UNITED STATES PATENT OFFICE 2,391,017

BRAKE CONTROL MECHANISM

Raymond B. Grontkowski, Washington, D. C.

Application November 2, 1942, Serial No. 464,255

5 Claims. (Cl. 137—139)

This invention relates to brake control mechanism and more particularly to devices for use in fluid pressure braking systems.

Among the objects of the present invention is included mechanism which automatically retains the brakes of a motor driven vehicle or similar device on an incline in applied position under control of the operator after the brake pedal has been released.

Other and further objects of the present invention will appear from the more detailed description set forth below, it being understood, however, that such more detailed description is given by way of explanation and illustration only, and not by way of limitation, since various changes therein may be made by those skilled in the art without departing from the scope and spirit of the present invention.

In connection with that more detailed description, there is shown in the accompanying drawing, in Figure 1, a section through the valve chamber of the present invention; and in Figure 2, a section on the line 2—2 of Figure 1.

As illustrated, the present invention is concerned with mechanisms and devices for holding a motor driven vehicle on an incline after the brake pedal has been released, and may for convenience be designated a hill holder to provide greater ease of vehicular control on hills and in traffic.

Generally speaking, the general assembly may be said to be comprised of four (4) units—1 the valve assembly, 2 the contactor (switch), 3 the electric cable, and 4 a source of electrical energy such as a storage battery, so connected to the master cylinder and clutch pedal to keep the brakes applied as long as the clutch pedal is depressed when the vehicle is on an up-grade, even after the brake pedal is released; thus enabling the driver to use his right foot for the accelerator pedal.

The hill holder is located between the master cylinder and wheel cylinders. The contactor (switch) is located in a convenient location near the clutch pedal and in such a position that the contacting linkage can be actuated to make contact to complete the electric circuit when the clutch pedal is depressed; or the contactor is located in a convenient location near the clutch pedal and is connected by means of a linkage so that the contact linkage can be actuated when the clutch is depressed. An electric cable connects between the valve assembly, battery and the contactor (switch), completes the hill holder assembly.

Brake fluid from the master cylinder enters the inlet of the valve assembly of the hill holder and passes through the outlet of the valve to the wheel cylinders when the brake pedal is depressed.

The contactor (switch), battery, and cable connections are conventional features, and therefore, not specifically illustrated. The invention here is particularly concerned with the valve chamber and assembly.

Within the valve assembly of the hill holder is a valve desirably operated by a steel ball. The position of the ball is controlled by gravity, an electromagnet, and a hammer or plunger acting as a valve set obstructor, the electromagnet being energized by the completion of the electric circuit between the battery and the contactor or switch.

In the specific form of device illustrated in the drawing, a casing 1 desirably cylindrical, and having internal ribs 21, is provided at one end with a closure 2 which may be screw threadedly held in position, the closure 2 having a central opening 3 serving as the outlet for fluid from the valve chamber 4. The inner section of the closure 2 may desirably be provided with lugs 5 to prevent the gravity actuated ball valve 6 from engaging against the outlet 3 to close the same. The other end of the casing 1 is closed by a closure 7 threadedly held in position, the closure 7 having a head 8 and stem 9 through which an opening or passage 10 permits entry of fluid under pressure from the fluid master cylinder (not shown). A valve seat 11 is mounted on the head 8 of the closure 7 and extends therefrom a sufficient distance to provide side walls 12 having the head 13 which serves as the valve seat proper, an opening or passage 14 communicating with the passage 10 and the chamber 4. A ring shaped hammer 15 surrounds the head 13 and is adapted to reciprocate thereon the hammer is notched or the like on the side adjacent the ball in order that there may be fluid flow when the valve is in the position shown in Figure 1. The hammer 15 carries a magnetizable collar 16 (as by screws 16') the inner edge of which surrounds the side walls 12 of the valve seat 11, and engages against the head 13 of the valve seat 11 to limit the movement of the collar 16 and hammer 15 in one direction, the movement in said direction being sufficient, however, to prevent the ball valve 6 from engaging against the valve seat 11. The hammer may thus be characterized as a valve seat obstructor. A coil spring 17 engages against the collar 16 and is held in position in the recess 18 on the head 8 of the closure 7 to maintain the member 15 in position normally to prevent contact of ball valve 6 with seat 13. A solenoid 19 is carried on the stem 9 of closure 7 and when energized, attracts the collar 16 and attached member 15, against the spring 17 a space being provided as shown at 20 to permit member 15 to be retracted a distance sufficient to uncover the head 13 of the valve seat and permit the ball when gravity actuated to engage against the valve seat.

The drawing illustrates the position of the ball and hammer (plunger) when the clutch pedal is released. When the clutch pedal is depressed, the contactor (switch) is actuated, completing the electric circuit between the battery and the electromagnet coil, which creates a magnetic field drawing the spring loaded hammer toward the electromagnet. This in turn permits the ball to roll (left) against the valve seat of the valve assembly of the hill holder. When the vehicle is stopped on an up-grade with the brakes applied and the clutch pedal depressed, the ball rolls against the valve seat, preventing the brake fluid in the wheel cylinders from returning to the master cylinder. Pressure is, therefore, maintained in the wheel cylinder to keep the brakes applied. When the clutch is released, the contact is broken at the contactor (switch), which breaks the electrical circuit between the battery and the electromagnet of the valve assembly of the hill holder, releasing the spring loaded hammer (plunger), which forces the ball away from the valve seat allowing the brake fluid to pass through the valve to the master cylinder, thus releasing the brake.

When the vehicle is on a down-grade, the ball rolls away from the valve seat, rendering the valve inoperative regardless if the electromagnet is energized and the hammer (plunger) is depressed. The hill holder does not affect ordinary use of the brake when the brakes are applied, as pressure from the master cylinder forces the ball away from the valve seat, (even after the clutch pedal is depressed, completing the electric circuit to energize the electromagnet of the valve assembly of the hill holder), allowing the fluid to flow to the outlet to the wheel cylinders.

The hill holder assembly is fool-proof; should the electric cable by the contactor (switch) be broken or the vehicle battery should not have enough electrical energy to operate the electromagnet of the valve assembly of the hill holder; the hill holder assembly will be inoperative, inasmuch as the hammer (plunger) will continue to remain in a position to eliminate the ball from rolling against the valve assembly.

The hill holder assembly of the present invention presents many advantages: it is simple in construction; the valve assembly employs but three moving parts; no packing gland is required; there is no necessity for any mechanical linkage between the clutch pedal and the valve assembly; it requires no specific installation position but can be installed in any location between the master cylinder and the distribution fitting and wheel cylinders; it is universal in application and may be used with hydraulic, air, and vacuum brake systems; it is easy to install and is fool-proof; and it is inexpensive and requires but very little maintenance.

Having thus set forth my invention, I claim:

1. In a fluid pressure braking system, a valve chamber having an inlet and an outlet for pressure fluid, a valve seat at said inlet, a valve within said chamber adapted to engage by gravity against said valve seat to close the fluid inlet, spring pressed means for maintaining said valve normally out of contact with said valve seat, and electromagnetically operated means for immobilizing said first named means to permit the valve to engage against the valve seat by the action of gravity.

2. In a fluid pressure braking system, a valve chamber having an inlet and an outlet for pressure fluid, a valve seat at said inlet, a valve within said chamber adapted to engage by gravity against said valve seat to close the fluid inlet, a reciprocable member between said valve and valve seat spring pressed to maintain the valve normally out of contact with the valve seat, said member having a magnetizable portion, an electromagnet carried on said valve chamber adapted on being energized to actuate said reciprocable member against the spring to permit the valve to engage the valve seat by gravity.

3. In a fluid pressure braking system, a valve chamber having an inlet and an outlet for pressure fluid, a valve seat at said inlet, a valve within said chamber adapted to engage by gravity against said valve seat to close the fluid inlet, a reciprocable member between said valve and valve seat spring pressed to maintain the valve normally out of contact with the valve seat, said member having a magnetizable portion, an electromagnet carried on said valve chamber adapted on being energized to actuate said reciprocable member against the spring to permit the valve to engage the valve seat by gravity, and on being de-energized to release said member under the action of the spring to disengage the valve from the valve seat.

4. In fluid pressure braking systems, a casing, a valve chamber within said casing said chamber having a fluid inlet at one end thereof and a fluid outlet at the other end, a valve seat at said inlet, a ball valve within said chamber adapted to engage by gravity against the valve seat, a ring shaped reciprocable member surrounding said valve seat adapted to move in one direction to permit said ball valve to engage against said valve seat, and in the opposite direction to disengage said ball valve from said seat, a magnetizable ring-shaped member carried by said reciprocable member, an electromagnet carried on the casing at the inlet end of the chamber, and a spring between said reciprocable member and said electromagnet to position said member normally away from the electromagnet and prevent the ball valve from engaging the seat.

5. In a fluid pressure braking system for motor driven vehicles having a valve chamber in which a valve alternately engages a valve seat to close and open a passage, a reciprocable member between said valve and valve seat spring pressed to maintain the valve normally out of contact with the valve seat, said member having a magnetizable portion, an electromagnet carried on said valve chamber adapted on being energized to actuate said reciprocable member against the spring to permit the valve to engage the valve seat by gravity.

RAYMOND B. GRONTKOWSKI.